[11] 3,610,871

[72] Inventor Robert Miller Lumley
Greensboro, N.C.
[21] Appl. No. 12,667
[22] Filed Feb. 19, 1970
[45] Patented Oct. 5, 1971
[73] Assignee Western Electric Company, Incorporated
New York, N.Y.

[54] INITIATION OF A CONTROLLED FRACTURE
8 Claims, 4 Drawing Figs.
[52] U.S. Cl. ..................................................... 219/121 L,
299/14
[51] Int. Cl. ..................................................... B23k 27/00
[50] Field of Search .......................................... 225/2, 96,
96.5; 219/121, 121 L, 121 EB

[56] References Cited
UNITED STATES PATENTS
3,112,850  12/1963  Garibotti ..................... 225/2

FOREIGN PATENTS
1,244,346   7/1967  Germany ..................... 219/121 L

Primary Examiner—J. V. Truhe
Assistant Examiner—Robert E. O'Neil
Attorneys—W. M. Kain, R. P. Miller and R. C. Winter ABSTRACT: Ceramic substrates, and the like, are parted by reflecting a focused laser beam off a mirrored surface so that the focal point of the beam impinges upon the lower surface of the substrate at an extreme edge thereof. The impingement of the focused beam creates a precisely defined localized fracture in the substrate. Next, the substrate is displaced, relative to the laser beam, to intercept the beam before it is reflected from the mirrored surface. The laser beam is now intercepted by the upper surface of the substrate before the beam reaches its focal point, resulting in the beam energy being distributed over a larger area of the substrate. As the relative displacement of the laser beam with respect to the substrate continues, the localized fracture is controllably propagated along the substrate to part the substrate.

PATENTED OCT 5 1971

3,610,871

PRIOR ART

INVENTOR
R. M. LUMLEY
BY Byron W. Sheffield
ATTORNEY

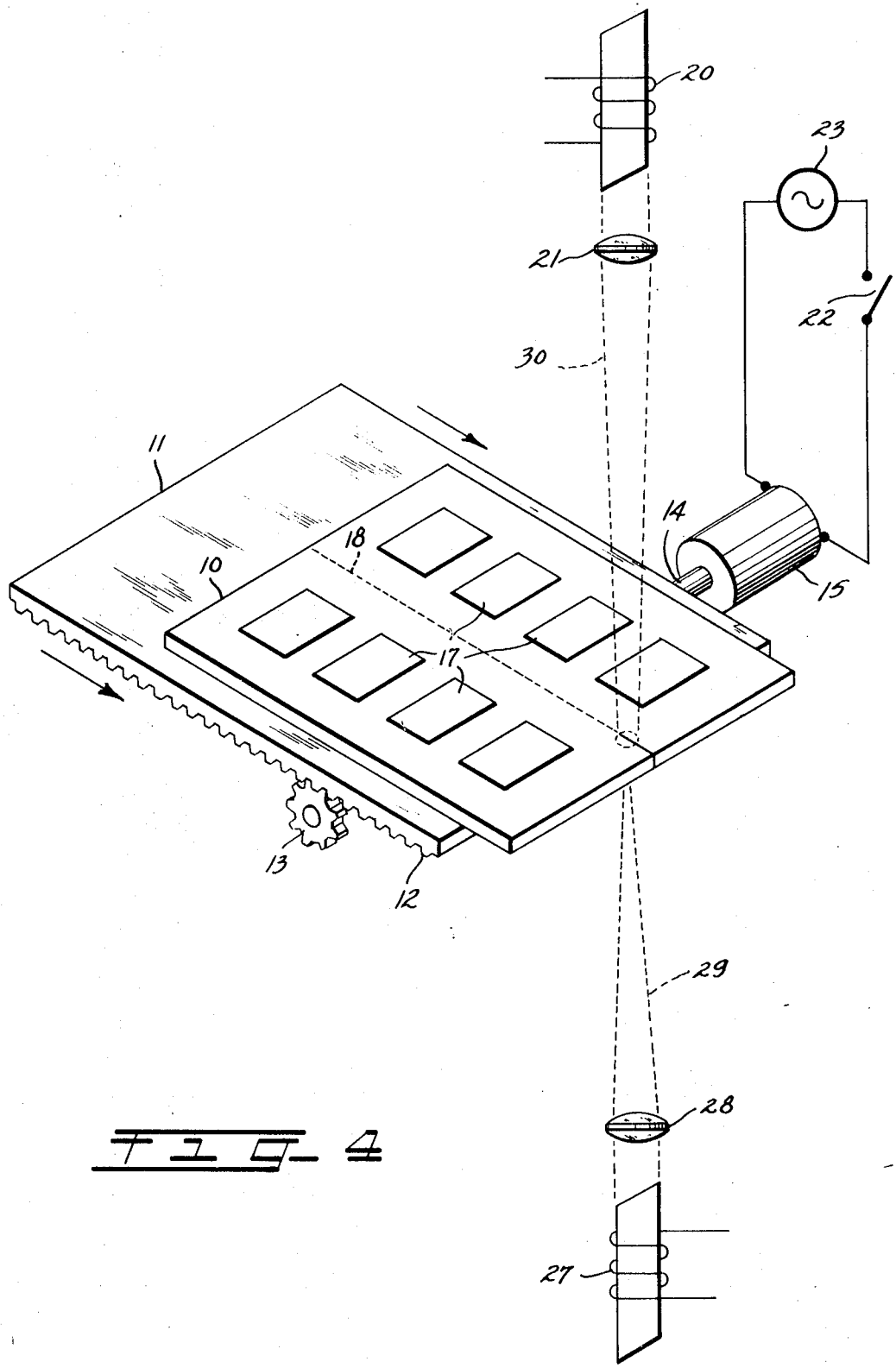

3,610,871

INITIATION OF A CONTROLLED FRACTURE

BACKGROUND OF THE INVENTION

Broadly speaking, this invention relates to the parting of substrates. More specifically, in a preferred embodiment, this invention relates to methods and apparatus for parting a substrate by the use of a focused beam of radiant energy.

U.S. Pat. application, Ser. No. 691,883, filed on Dec. 19, 1967 in the names of C. E. Graham, R. M. Lumley and D. J. Oberholzer, and which is assigned to the same assignee as the instant invention, discloses methods and apparatus for parting ceramic substrates, and the like, by the use of a beam of light from an optical maser. As disclosed in that application a focused laser beam is applied to an extreme edge of the substrate to be parted to create a localized fracture through the substrate. The strength of the laser beam is carefully adjusted so that its energy density is sufficiently high to create the desired localized fracture but not so high as to cause deleterious damage to the surface of the substrate. The adjustment of the beam energy is effected either by reducing the power supplied to the laser or by moving the surface of the substrate away from the focal point of the laser beam. Once the localized fracture is created in the substrate, the laser beam is moved, relative to the substrate, to controllably propagate the localized fracture across the substrate, and thereby part the substrate.

It has been discovered that, with some types of substrate material, the initial localized fracture takes a random path through the substrate rather than following the desired partition path. Although the initial fracture ultimately returns to and propagates along the desired path, as the laser beam is displaced relative to the substrate along the desired path, there is, nevertheless, an initial period when the parting process may be said to be unpredictable. This in turn may lead to damage to several of the thin-film circuits which are fabricated on the surface of the substrate to be parted. Since each of these thin-film circuits undergoes a plurality of processing steps prior to partition, this damage represents an appreciable economic loss and raises the average cost of those circuits which are successfully parted from the substrate.

The path which the initial localized fracture takes through the substrate may be more precisely controlled if the energy density of the laser beam is increased. However, if this is done, the surface of the substrate is subject to deleterious damage, for example, the vaporization (and subsequently condensation) of the material from which the substrate is manufactured.

SUMMARY OF THE INVENTION

As a solution to the above problem, this invention contemplates a method of parting a substrate into at least two portions by first directing the focal point of a focused laser beam onto an extreme edge of one surface of the substrate, to create a localized fracture in the substrate, and second, displacing the substrate and the laser beam, relative to one another, so that another surface of the substrate intercepts at a point spaced apart from the focal point of the beam. The localized fracture which is so created is then controllably propagated across the substrate by the continuing relative displacement to part the substrate into the at least two portions.

An illustrative apparatus for practicing the above method comprises a source of a beam of focused radiant energy and a support member for maintaining the substrate proximate the beam source. The apparatus further includes means for directing the focal point of the focused beam onto an extreme edge of one surface of the substrate to create a localized fracture therein and means for displacing the support member and the radiant energy source, relative to one another, along the desired path of partition, so that the substrate intercepts at a point spaced apart from the focal point of the beam, the beam to controllably propagate the localized fracture along the desired path and thereby part the substrate.

DESCRIPTION OF THE DRAWINGS

FIG. 4 is a partial, isometric view of an alternative embodiment of this invention in which two laser beams are used.

DETAILED DESCRIPTION OF THE INVENTION

Figure 1:
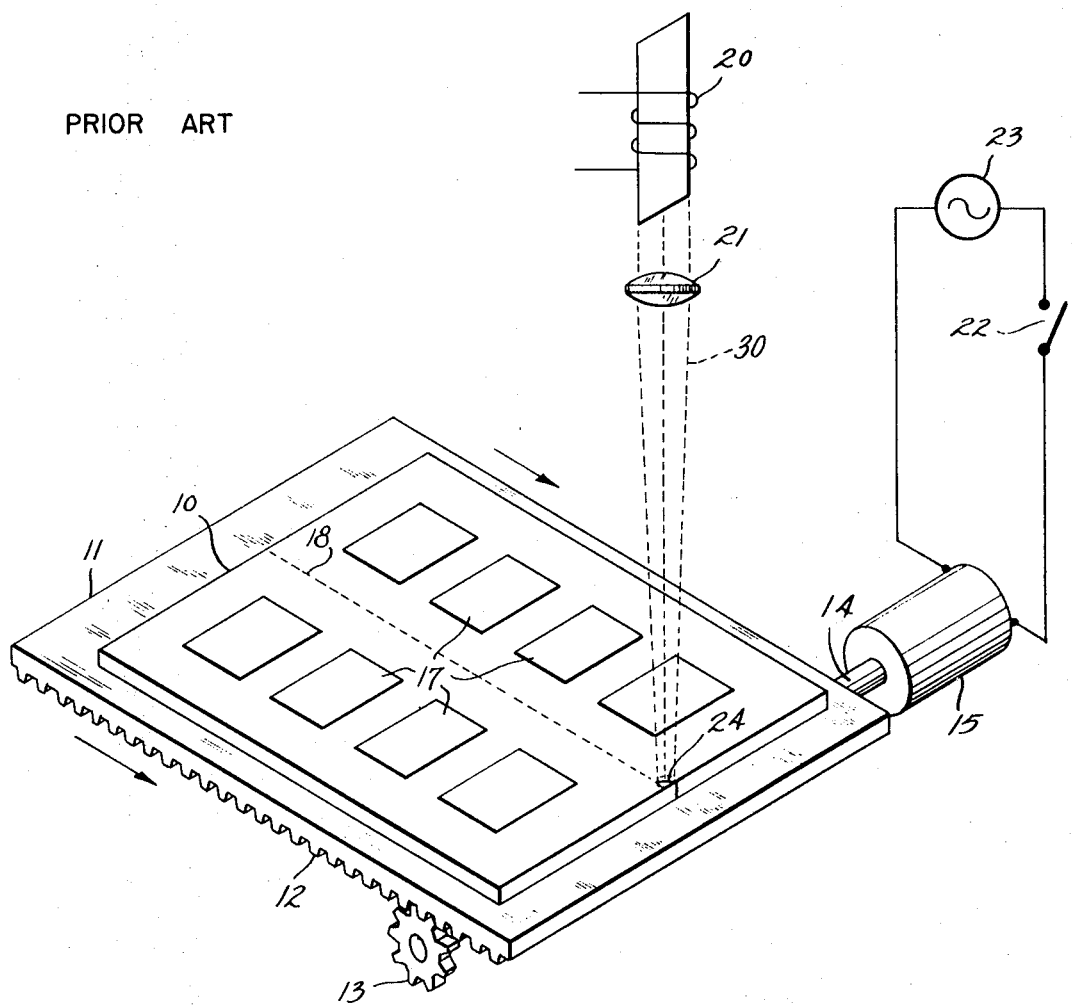
FIG. 1 is a partial, isometric view of a prior art substrate parting apparatus of the type contemplated in the above-discussed U.S. Pat. application, Ser. No. 691,883.

FIG. 1 illustrates the parting of a substrate according to the teachings of the above-identified patent application of C. E. Graham, R. M. Lumley and D. J. Oberholzer. As shown, a substrate 10 of ceramic, or other material, is placed upon a flat support member 11, which member is adapted for travel in the horizontal plane by means of a rack 12 and pinion 13 driven by the shaft 14 of an electric motor 15. Substrate 10 has a plurality of thin-film circuits 17 fabricated thereon and it is desired to part the substrate along a path 18 which illustratively passes along the length of the substrate, intermediate the first and second rows of thin-film circuits 17.

Light from a laser 20 is focused by a lens system 21 upon the upper surface of the substrate 10 at an extreme edge of the substrate. The lens system is so adjusted that the focal point of the laser beam image falls precisely at the upper surface of the substrate. As disclosed in the above-identified application, the concentrated laser energy creates a localized fracture in the substrate; and, when motor 15 is connected by the closure of a switch 22 to a suitable source of AC current source 23, the motor is energized to rotate shaft 14 and pinion 13. This, in turn, advances support member 11, and hence substrate 10, beneath the focused beam of light from laser 20. As discussed in the above-identified application, this relative movement controllably propagates the initial localized fracture, which was created in the substrate, along the desired partition path 18. As further disclosed in the above-identified application, the power density of the light from laser 20 is carefully adjusted so that it is sufficiently high to propagate the localized fracture along the partition path 18 but is not so high as to cause deleterious damage to the surface of the substrate.

As previously mentioned, when the power of laser 20 is so adjusted, it has been noted that, with certain types of substrates, the initial fracture which is created tends to follow a random path 24 through the substrate and deviates from the desired partition path 18. This random path may, in some instances, cross over into the area of the substrate which is occupied by thin-film circuits 17, destroying or seriously damaging some of them. The fracture in the substrate ultimately returns to the desired path 18, when the laser is displaced relative to the substrate along the remaining portion of path 18.

Figure 2:
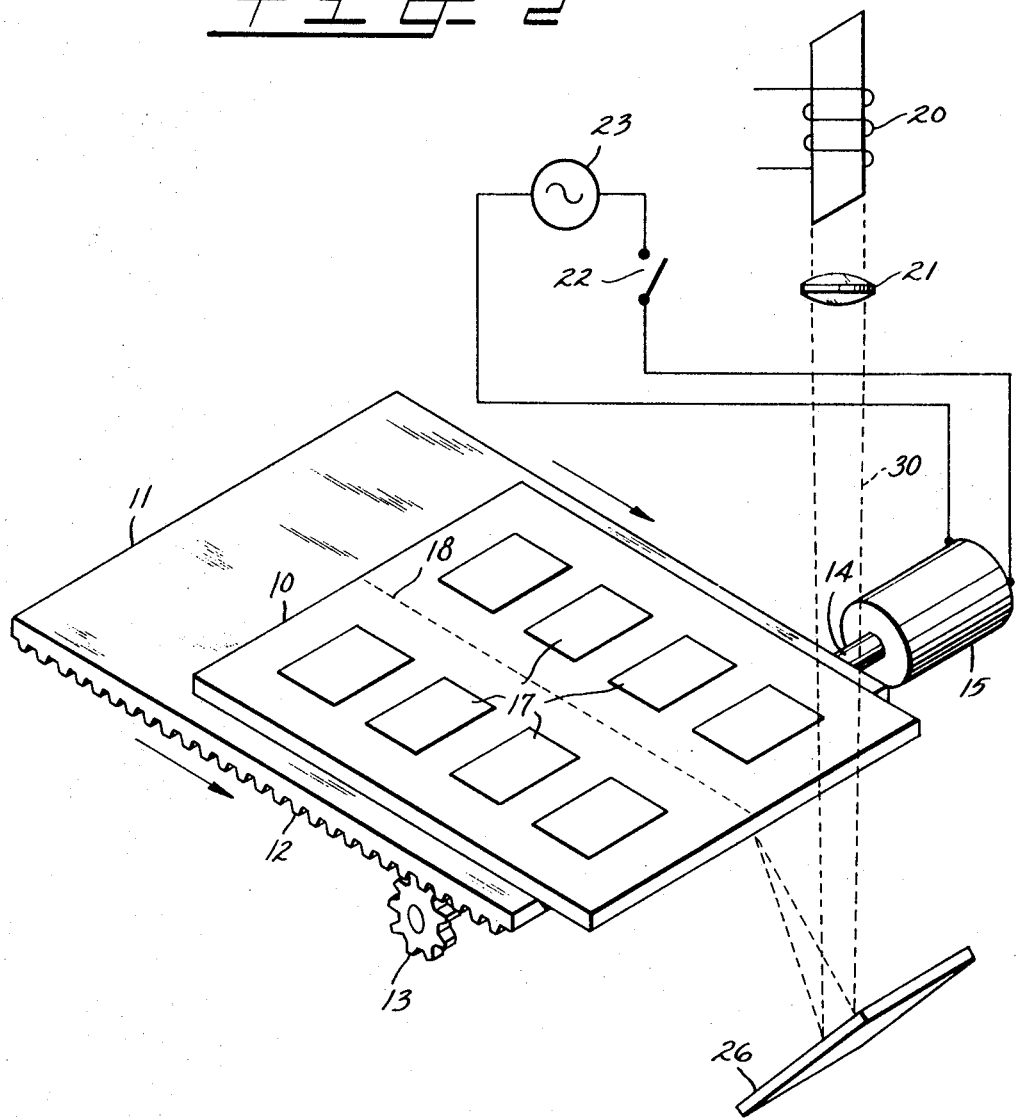
FIG. 2 is a partial, isometric view of an apparatus according to this invention in which the laser beam is initially reflected off a mirrored surface to impinge upon the lower surface of the substrate to be parted.

FIG. 2 illustrates a method and apparatus which, it has been discovered, eliminates the random nature of the initial localized fracture which is created in the substrate. As shown, substrate 10 is now positioned on support member 11 so that one edge thereof overhangs the support member, rendering the lower surface of the substrate accessible to impingement by laser energy. A mirrored surface 26 is positioned beneath laser 20 and lens system 21 to reflect the laser energy off the mirrored surface so that it impinges upon the lower surface of substrate 10. Advantageously, the mirrored surface is fixed to, and travels with, support member 11. However, this is not essential and mirror 26 may be secured to some fixed, nonmoving member if desired. The focus of lens system 21 is now adjusted so that the laser beam is focused upon the lower surface of substrate 10, in alignment with the desired partition path 18. Since there are no thin-film circuits 17 fabricated on the lower surface of substrate 10, the power density of laser 20 can be increased considerably over that which could be safely permitted were the laser beam to be applied directly to the upper surface of substrate 10. It has been discovered that this increase in laser power insures that the localized fracture, which is treated in the substrate, is located exactly on the desired path 18. Whatever deleterious damage is created by this high-power laser beam is of no significance, as the damage cannot affect the thin-film circuits 17 which are fabricated on the upper surface of the substrate.

Figure 3:
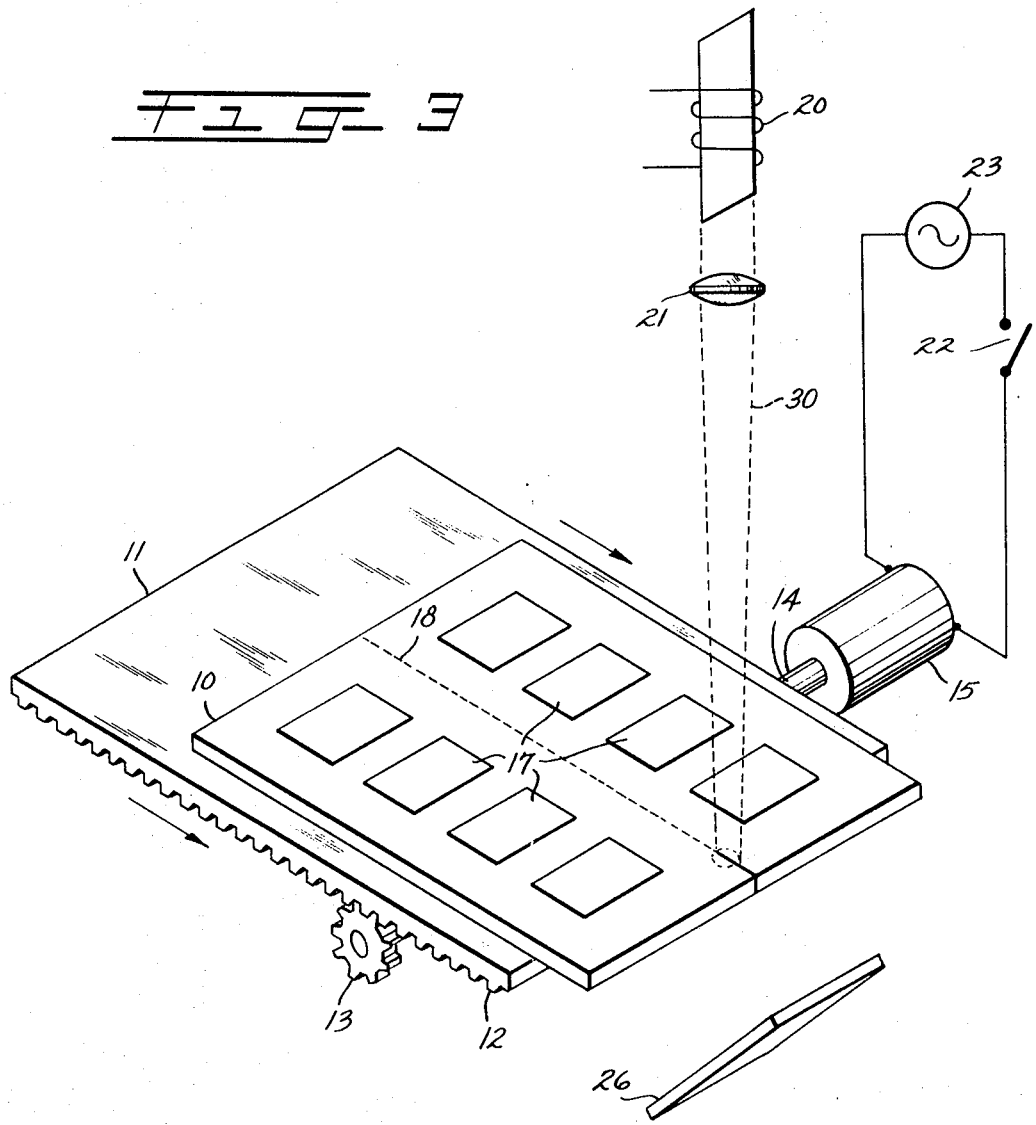
FIG. 3 is a partial, isometric view of the apparatus shown in FIG. 1 after the substrate has been displaced relative to the laser beam to intercept the beam from the laser source and to controllably propagate the localized fracture along the desired partition path.

As shown in FIG. 3, after the localized fracture has been created, motor 15 continues to move support member 11 relative to laser 20. As support member 11 moves forward, substrate 10 is advanced and intercepts the beam from laser 20, blocking the optical path to mirrored surface 26 and, hence, terminating the application of the focused beam from laser 20 to the lower surface of substrate 10. The beam from laser 20 now impinges upon the upper surface of the substrate above the focal point of the beam The power density of the beam which traverses partition path 18 is thus considerably reduced, inhibiting deleterious damage to the critically sensitive upper surface of substrate 10. Nevertheless, the power density is sufficiently high to propagate the localized fracture along the partition path 18 and parts the substrate into the desired pieces.

One skilled in the art will appreciate that an optical prism or a light pipe could be substituted for reflecting surface 26 to direct the beam from laser 20 onto the lower surface of substrate 10. It will further be appreciated that substrate 10 need not overhang support member 11, and that a suitable aperture or transparent portion could be fabricated in support member 11 to permit the exposure of an extreme edge of the lower surface of the substrate.

An alternative embodiment of the invention uses two separate and distinct laser sources as shown in FIG. 4. The first laser source 27 is a high-energy density laser source focused by lens system 28 so that the focal point of beam 29 is directed; onto the extreme edge of the lower surface of substrate 10; and the other laser source 20 is of lower power, or similar power, but focused so that beam 30 impinges above the focal point of the beam; upon the upper surface of substrate 10. Substrate 10 is moved, relative to the laser beam, so that the beam traverses the substrate along the path 18 to part the substrate. Laser 27 is deenergized after the initial fracture is created. Thus, laser source 27 is used solely to create the initial fracture in the substrate; and laser source 20 is used solely to propagate the localized fracture along the desired partition path 18.

In the embodiment described herein, it would be apparent to one skilled in the art to alternatively hold substrate 10 stationary and cause laser beam 30 to move with the substrate to traverse path 18. Also, it would be apparent to one skilled in the art to focus laser beam 30 to intercept substrate 10 beyond the focal point of beam 30, instead of before the focal point thereof, as beam 30 is traversing path 18.

As used in the specification and claims, the term "substrate" is intended to include any material upon which electrical circuits and/or components can be fabricated or supported. Thus, the term not only includes insulating substrates such as glass, alumina, ceramic, quartz, sapphire, etc., but semiconductive materials such as silicon or germanium slices, and the like.

The above discussion assumed that the substrate was to be parted across its entire length. It will be appreciated, however, that the methods and apparatus disclosed herein are equally applicable to those situations where the fracture is to be initiated in the substrate some distance away from the edges thereof. In that event, reflecting surface 26 would be positioned to reflect the focused beam, through a suitable aperture in the support member 11, onto the rear surface of the substrate at the exact point where it is desired to initiate partition of the substrate. The relative movement of the beam and the substrate would then be arranged to intercept the reflected beam and terminate impingement thereof on the lower surface of the substrate to controllably propagate the localized fracture along the desired partition path, as previously discussed with reference to FIGS. 2 and 3.

It will be appreciated that those skilled in the art could make various changes and modifications to the methods and apparatus disclosed herein without departing from the spirit and scope of the invention.

What is claimed is:

1. A method of parting a substrate, having at least first and second major surfaces, into at least two portions, comprising the steps of:

projecting a focused beam of radiant energy along a first path;

placing said substrate proximate said first path so that said first major surface faces the source of said beam, without intercepting said beam;

deflecting said beam from said first path, through a controlled angle onto a second path, so that said beam impinges on the edge of said second major surface, said second major surface coinciding with the focal point of said now-deflected beam, thereby creating a localized fracture in said substrate which penetrates therethrough from said second major surface to said first major surface;

displacing said substrate into said first path so that the region of said localized fracture on said first major surface intercepts said beam, said first major surface being spaced apart from said focal point by at least the thickness of said substrate; and further displacing said substrate, relative to said first path, so that the impingement of said beam on said first major surface traverses a predetermined partition path, thereby propagating said localized fracture along said partition path to part said substrate into said at least two portions.

2. A method of parting a substrate, having at least first and second major surfaces, into at least two portions, comprising the steps of:

momentarily applying a first focused beam of radiant energy to an extreme edge of said first major surface, said first major surface coinciding with the focal point of said first beam, to create a precisely located localized fracture in said substrate which penetrates therethrough from said first major surface to said second major surface;

applying a second focused beam of radiant energy to said second major surface, said second major surface being spaced apart from the focal point of said second beam by a predetermined distance, so that said second beam impinges on said second major surface in the region of said localized fracture;

displacing said substrate, relative to said second beam, so that the impingement of said second beam on said second major surface traverses a predetermined path, thereby propagating said localized fracture along said predetermined path to part said substrate into said at least two portions.

3. A method of parting a substrate into at least two portions, comprising the steps of:

momentarily applying a first focused beam of radiant energy to an extreme edge of a surface of said substrate, said surface coinciding with the focal point of said first beam, to create a precisely located localized fracture which penetrates through said substrate;

applying a second focused beam of radiant energy to the surface of said substrate, said surface being spaced apart from the focal point of said second beam by a predetermined distance, so that said second beam impinges on said surface in the region of said localized fracture;

displacing said substrate, relative to said second beam, so that the impingement of said second beam on said surface traverses a predetermined partition path, thereby propagating said localized fracture along said partition path to part said substrate into said at least two portions.

4. A method of parting a substrate, having at least first and second major surfaces, into at least two portions, comprising the steps of:
projecting a focused beam of radiant energy along a first path onto a mirrored surface, thence along a second path to an extreme edge of said first major surface of said substrate, said first major surface coinciding with the focal point of said beam, thereby creating a localized fracture in said substrate which penetrates therethrough from said first major surface to said second major surface;
displacing said substrate, relative to said beam, so that the substrate intercepts said first path, said beam impinging on said second major surface in the region of said localized fracture, said second major surface being spaced apart from said focal point by at least the thickness of said substrate; and
further displacing said substrate, relative to said first beam, so that the impingement of said beam on said first major surface traverses a predetermined partition path, thereby propagating said localized fracture along said partition path.

5. An apparatus for parting a substrate, having first and second major surfaces, along a predetermined partition path, which comprises:
a source of a focused beam of radiant energy;
means for deflecting said beam onto an extreme edge of the first major surface of said substrate, said first major surface coinciding with the focal point of said beam, thereby creating a localized fracture in said substrate which penetrates therethrough from said first major surface to said second major surface;
means for displacing said substrate, relative to said beam, so that said substrate intercepts said beam between said source and said means for deflecting, said beam impinging upon the second major surface of said substrate in the region of said localized fracture, said second major surface being spaced apart from said focal point by at least the thickness of said substrate; and
means for continuing said displacement so that the impingement of said beam on said second major surface traverses said partition path, thereby propagating said localized fracture along said partition path to part said substrate.

6. The apparatus as defined in claim 5 in which said source of a focused beam of radiant energy is a laser.

7. The apparatus defined in claim 6 in which said means for deflecting said beam is a mirrored surface.

8. The apparatus defined in claim 7 in which said means for displacing said substrate and said means for continuing said displacement is a slidably mounted support member which supports said substrate and which is moved by an electric motor connected to said support member through rack-and-pinion gearing.

L-566-PT
(6-69)

UNITED STATES PATENT OFFICE
CERTIFICATE OF CORRECTION

Patent No. __3,610,871__  Dated __October 5, 1971__

Inventor(s) __R. M. Lumley__

It is certified that error appears in the above-identified patent and that said Letters Patent are hereby corrected as shown below:

In the specification, Column 1, line 59, after "intercepts" insert --the laser beam--. Column 1, line 72, after "intercepts" insert --the beam,--.
Column 1, line 73, delete "the beam" (Second Occurrence).
Column 2, line 14, "FIG. 4" should begin new paragraph.
Column 3, line 21, "beam The" should read --beam. The--.
Column 3, line 41, "directed;" should read --directed--.
Column 3, line 44, "beam;" should read --beam--.

In the claims, claim 1, column 4, line 22, "the" should read --an--.

Signed and sealed this 4th day of April 1972.

(SEAL)
Attest:

EDWARD M. FLETCHER, JR.
Attesting Officer

ROBERT GOTTSCHALK
Commissioner of Patents